United States Patent
Wang et al.

(10) Patent No.: US 9,745,724 B2
(45) Date of Patent: Aug. 29, 2017

(54) PRESSURE COMPENSATION VALVE

(71) Applicant: JIANGSU HENGLI HYDRAULIC CO., LTD, Changzhou, Jiangsu (CN)

(72) Inventors: Liping Wang, Jiangsu (CN); Caifu Yuan, Jiangsu (CN); Qiang Lu, Jiangsu (CN); Zhan Chen, Jiangsu (CN); Hongguang Liu, Jiangsu (CN)

(73) Assignee: JIANGSU HENGLI HYDRAULIC CO., LTD, Changzhou (CN)

( * ) Notice: Subject to any disclaimer, the term of this patent is extended or adjusted under 35 U.S.C. 154(b) by 152 days.

(21) Appl. No.: 14/818,332

(22) Filed: Aug. 5, 2015

(65) Prior Publication Data

US 2015/0354173 A1   Dec. 10, 2015

Related U.S. Application Data

(63) Continuation of application No. PCT/CN2013/001644, filed on Dec. 25, 2013.

(30) Foreign Application Priority Data

Nov. 20, 2013 (CN) .......................... 2013 1 0589059
Nov. 20, 2013 (CN) ..................... 2013 2 0740484 U

(51) Int. Cl.
| | |
|---|---|
| *F16K 31/12* | (2006.01) |
| *E02F 9/22* | (2006.01) |
| *F16K 1/30* | (2006.01) |
| *F16K 1/52* | (2006.01) |
| *F16K 15/18* | (2006.01) |

(Continued)

(52) U.S. Cl.
CPC .......... *E02F 9/2225* (2013.01); *E02F 9/2267* (2013.01); *F15B 13/026* (2013.01); *F16K 1/307* (2013.01); *F16K 1/526* (2013.01); *F16K 15/18* (2013.01); *F16K 31/1221* (2013.01); *F15B 13/01* (2013.01); *F15B 13/0405* (2013.01); *F15B 2211/6052* (2013.01);
(Continued)

(58) Field of Classification Search
CPC ......... Y10T 137/7764; Y10T 137/7768; Y10T 137/7781
See application file for complete search history.

(56) References Cited

U.S. PATENT DOCUMENTS

| | | | | |
|---|---|---|---|---|
| 3,211,174 A | * | 10/1965 | Weise ................... | F16K 17/105 137/469 |
| 2014/0166138 A1 | * | 6/2014 | Bisig ..................... | F16K 15/025 137/625 |
| 2015/0114492 A1 | * | 4/2015 | Oksanen ................. | G05D 7/03 137/487 |

FOREIGN PATENT DOCUMENTS

| | | |
|---|---|---|
| CN | 1159849 A | 9/1997 |
| CN | 201547046 U | 8/2010 |

OTHER PUBLICATIONS

International Search Report of PCT Patent Application No. PCT/CN2013/001644 dated Sep. 3, 2014.

* cited by examiner

*Primary Examiner* — R. K. Arundale

(57) ABSTRACT

A pressure compensation valve comprises a valve body, a valve sleeve fixedly mounted on the valve body, and a spool disposed in a valve hole of the valve body and capable of moving. The pressure compensation valve can change the pressure compensation characteristic, that is, the pressure compensation valve can change the difficult degree of the pressurized oil liquid flowing by changing an effective pressure acting surface of the pressure compensation valve The structure is simple, requires low cost, and increases the utilization rate of a product.

8 Claims, 1 Drawing Sheet

(51) Int. Cl.
 *F16K 31/122* (2006.01)
 *F15B 13/02* (2006.01)
 F15B 13/01 (2006.01)
 F15B 13/04 (2006.01)
(52) U.S. Cl.
 CPC .... *Y10T 137/7762* (2015.04); *Y10T 137/7764* (2015.04); *Y10T 137/7842* (2015.04)

PRESSURE COMPENSATION VALVE

CROSS REFERENCE TO RELATED APPLICATIONS

The present application is a Continuation Application of PCT application No. PCT/CN2013/001644 filed on Dec. 25, 2013, which claims the benefits of Chinese Patent Application No. 201310589059.4 filed on Nov. 20, 2013 and Chinese Utility Model Application No. 201320740484.4 filed on Nov. 20, 2013. All the above are hereby incorporated by reference.

FIELD OF THE INVENTION

The present disclosure relates to a pressure compensation valve for use in a hydraulic circuit, where the hydraulic circuit is used to allocate and supply the discharged pressurized liquid of one or more hydraulic pumps in a construction machine to many actuators according to the flow rate.

BACKGROUND OF THE INVENTION

Supplying a certain discharged pressurized liquid of one hydraulic pump to many actuators may be achieved in the following way: providing a plurality of hydraulic reversing valves in a discharge path of the hydraulic pump, and supplying the pressurized liquid to the actuators by switching the hydraulic reversing valves. When the pressurized liquid is to be simultaneously supplied to many actuators, the liquid will be preferentially supplied to actuators having a low load pressure and, correspondingly, liquid supplied to actuators having a relatively high load pressure will be reduced or cut off.

To solve this problem, most of the hydraulic circuits are provided with pressure compensation valves between the hydraulic reversing valves and the actuators, and a maximum load pressure among all of the actuators is detected and applied to the pressure compensation valves so that the exit pressure of each of the hydraulic reversing valves is uniformly increased to be substantially the same as the maximum load pressure. Thereby, when the hydraulic reversing valves are operating simultaneously, the pressurized liquid passing through the hydraulic reversing valves is supplied to the actuators at an allocation rate proportional to the open area of each of the hydraulic reversing valves.

A pressure compensation valve disclosed in Chinese Patent CN1159849A comprises: a valve for establishing or blocking a connection between an inlet and an outlet; a pressure chamber; a piston, being driven by a load pressure from the chamber and pushing the valve in the blocking direction; an intermediate pressure chamber, being connected to the inlet via a first conduit and pushing the valve in the blocking direction by the pressure therein; and a pressure-variable reducing valve, being adapted to release a pressurized fluid in the intermediate pressure chamber via the second conduit. However, compensation features required by some actuators will vary; some compensation valves can also function as check valves, or some compensation valves cannot change the pressure compensation features, or although some compensation valves can both function as the check valves and change the compensation features, the structure thereof is too complicated and the cost thereof is relatively high.

SUMMARY OF THE INVENTION

An objective of the present disclosure is to provide a pressure compensation valve which has a simple structure and a low cost and can both function as a check valve and change the compensation features, so as to solve the aforesaid problems.

The objective of the present disclosure is achieved by adopting the following technical solution: a pressure compensation valve is provided, which comprises a valve body, a valve sleeve fixedly mounted on the valve body, and a spool disposed in a valve hole of the valve body and capable of moving, wherein the valve sleeve and the spool are sequentially provided with a piston and a return spring, the piston is placed on an inner hole of the valve sleeve, the return spring is internally provided within a pressure chamber formed between the piston and the valve sleeve, and acts on a transverse end surface of the piston, a check valve only allowing a single-direction flow to an LS flow channel is disposed in an oil feeding chamber of the valve body, and the spool establishes or blocks a connection between the oil feeding chamber and an oil discharging chamber.

An upper end surface and a lower end surface of the spool described in the aforesaid technical solution have the same cross-sectional area as an upper end surface and a lower end surface of the piston, and a load pressure Pls from the pressure chamber and the return spring act on the upper end surface of the piston to drive the piston to slide downward and to push the spool upwards in a direction that blocks the connection between the oil feeding chamber and the oil discharging chamber.

An end of the spool described in the aforesaid technical solution is a cylindrical structure that slides as a slide valve, the cylindrical section is formed with a radial hole for establishing or blocking the connection between the oil feeding chamber and the oil discharging chamber; and the other end of the spool is provided with a tapered groove and a spherical pillar protruding from the other end.

A channel hole for the check valve is disposed at the bottom of the oil feeding chamber described in the aforesaid technical solution, the check valve detects a maximum load pressure Pls of the oil feeding chamber and inputs the maximum load pressure Pls into the LS channel in a single direction so as to transmit a maximum load pressure signal accurately when the load varies.

When the oil feeding chamber described in the aforesaid technical solution has a pressure higher than or equal to the maximum load pressure Pls, the pressure of the oil feeding chamber acts on the upper end surface of the spool to drive the spool so that the oil feeding chamber connects with the oil discharging chamber.

A tapered valve seat is disposed at the bottom of the oil discharging chamber described in the aforesaid technical solution, the oil discharging chamber acts on the lower end surface of the piston and the upper end surface of the spool simultaneously, and when the oil discharging chamber has a pressure higher than that of the oil feeding chamber, the pressure of the oil discharging chamber drives the spool to move downwards so that the tapered groove of the spool abuts against the tapered valve seat of the valve body tightly to form the check valve.

A valve hole for fixedly mounting the valve sleeve is formed at the top of the valve body described in the aforesaid technical solution, the valve body is further formed with an aperture for transferring the pressure Pls of the LS channel, and the valve sleeve is formed with an outer groove and an inner groove as well as a radial aperture between the outer groove and the inner groove.

The piston described in the aforesaid technical solution is formed with a step, a through-hole is formed in the step, the piston is formed with a concave cylinder at an end thereof and a small cylinder protruding from the other end thereof, an axial opening of the concave cylinder connects with the through-hole, and after being placed into the valve sleeve, the piston is capable of sliding within the inner hole of the valve sleeve.

The present disclosure has the following benefits: the pressure compensation valve of the present disclosure changes a pressure compensation feature, that is, changes an effective pressure acting surface A1 of the piston; for example, if the effective pressure acting surface A1 is increased, force pushing the piston is increased with respect to blocking, and the pressure in the oil feeding chamber is increased, thereby making a pressurized liquid difficult to flow; on the contrary, if the effective pressure acting surface A1 is decreased, the pressurized liquid becomes easy to flow. The structure is simple, requires low cost, and increases the utilization rate of a product.

BRIEF DESCRIPTION OF THE DRAWINGS

Hereinafter, the present disclosure will be further detailed according to specific embodiments and with reference to attached drawings so that the contents of the present disclosure is more readily and clearly appreciated.

Figure 1:
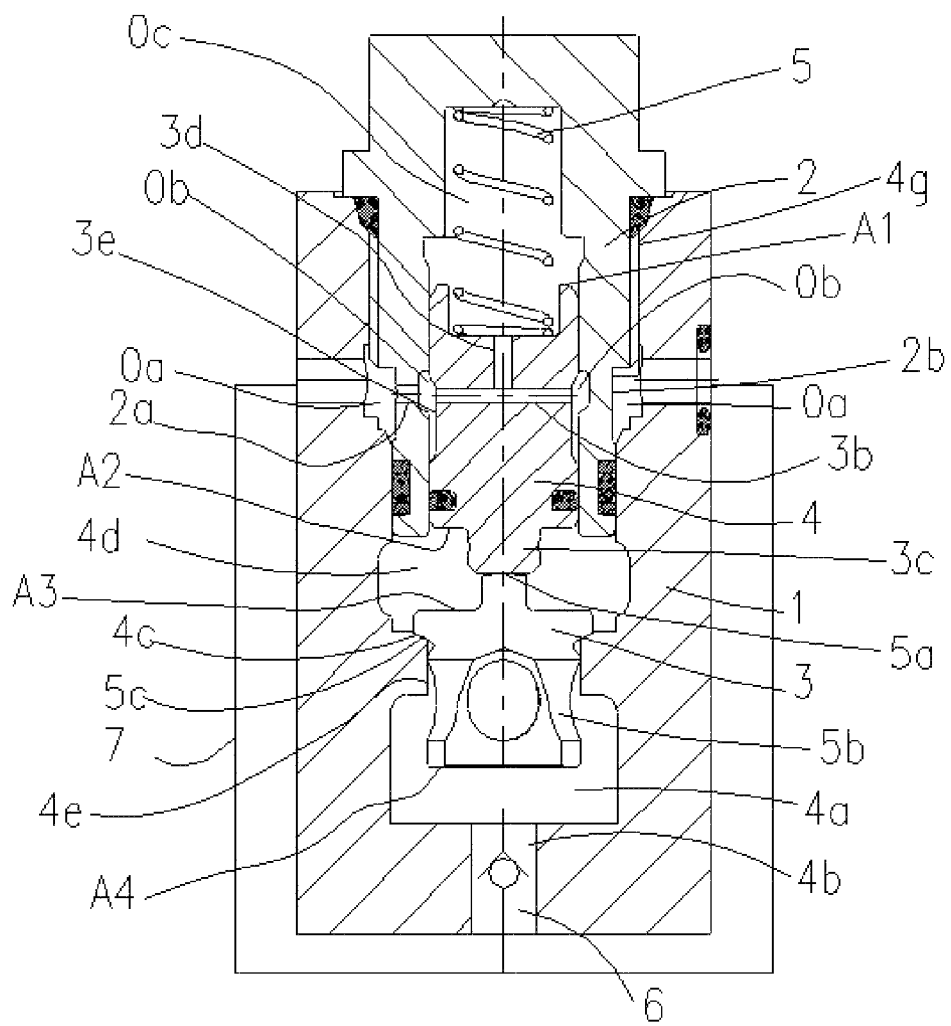
FIG. 1 is a schematic structural view of the present disclosure.

Reference numerals in the attached drawings are: 1: valve body; 2: valve sleeve;

3: spool; 4: piston; 5: return spring; 6: check valve; 7: LS flow channel; 0a: outer groove; 0b: inner groove; 0c: pressure chamber; 2a: aperture; 3a: concave cylinder; 3b: through-hole; 3c: small cylinder; 3d: opening; 4a: oil feeding chamber; 4b: channel hole; 4c: tapered valve seat; 4d: oil discharging chamber; 4g: valve hole; 5a: pillar; 5b: radial hole; 5c: tapered groove; A1: upper end surface of the piston; A2: lower end surface of the piston; A3: upper end surface of the spool; A4: lower end surface of the spool

DETAILED DESCRIPTION OF THE INVENTION

Referring to FIG. 1, a pressure compensation valve comprises: a valve body 1, a valve sleeve 2 fixedly mounted on the valve body 1, and a spool 3 disposed in a valve hole 4e of the valve body 1 and capable of moving, wherein the valve sleeve 2 and the spool 3 are sequentially provided with a piston 4 and a return spring 5, the piston 4 is placed on an inner hole of the valve sleeve 2, the return spring 5 is internally provided within a pressure chamber 0c formed between the piston 4 and the valve sleeve 2, and acts on a transverse end surface of the piston 4, a check valve 6 only allowing a single-direction flow to an LS flow channel 7 is disposed in an oil feeding chamber 4a of the valve body 1, and the spool 3 establishes or blocks a connection between the oil feeding chamber 4a and an oil discharging chamber 4d. An upper end surface A3 and a lower end surface A4 of the spool have the same cross-sectional area as an upper end surface A1 and a lower end surface A2 of the piston, and a load pressure Pls from the pressure chamber 0c and the return spring 5 act on the upper end surface A1 of the piston 4 to drive the piston 4 to slide downward and to push the spool 3 upwards in a direction that blocks the connection between the oil feeding chamber 4a and the oil discharging chamber 4d.

An end of the spool 3 is a cylindrical structure that slides as a slide valve, the cylindrical section is formed with a radial hole 5b for establishing or blocking the connection between the oil feeding chamber 4a and the oil discharging chamber 4d; and the other end of the spool 3 is provided with a tapered groove 5c and a spherical pillar 5a protruding from the other end. A channel hole 4b for the check valve 6 is disposed at the bottom of the oil feeding chamber 4a, the check valve 6 detects a maximum load pressure Pls of the oil feeding chamber 4a and inputs the maximum load pressure Pls into the LS channel 7 in a single direction so as to transmit a maximum load pressure signal accurately when the load varies. When the oil feeding chamber 4a has a pressure higher than or equal to the maximum load pressure Pls, the pressure of the oil feeding chamber 4a acts on the upper end surface A3 of the spool to drive the spool 3 so that the oil feeding chamber 4a connects with the oil discharging chamber 4d. A tapered valve seat 4c is disposed at the bottom of the oil discharging chamber 4d, the oil discharging chamber 4d acts on the lower end surface A2 of the piston and the upper end surface A3 of the spool simultaneously, and when the oil discharging chamber 4d has a pressure higher than that of the oil feeding chamber 4a, the pressure of the oil discharging chamber 4d drives the spool 3 to move downwards so that the tapered groove 5c of the spool 3 abuts against the tapered valve seat 4c of the valve body 1 tightly to form the check valve.

A valve hole 4g for fixedly mounting the valve sleeve 2 is formed at the top of the valve body 1, the valve body 1 is further formed with an aperture 2a for transferring the pressure Pls of the LS channel 7, and the valve sleeve 2 is formed with an outer groove 0a and an inner groove 0b as well as a radial aperture 2a between the outer groove 0a and the inner groove 0b. The piston 4 is formed with a step 3e, a through-hole 3b is formed in the step 3e, the piston 4 is formed with a concave cylinder 3a at an end thereof and a small cylinder 3c protruding from the other end thereof, an axial opening 3d of the concave cylinder 3a connects with the through-hole 3b, and after being placed into the valve sleeve 2, the piston 3 is capable of sliding within the inner hole of the valve sleeve 2.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A pressure compensation valve comprising a valve body (1), a valve sleeve (2) fixedly mounted on the valve body (1), and a spool (3) disposed in a valve hole (4e) of the valve body (1) and capable of moving, wherein the valve sleeve (2) and the spool (3) are sequentially provided with a piston (4) and a return spring (5), the piston (4) is placed on an inner hole of the valve sleeve (2), the return spring (5) is internally provided within a pressure chamber (0c) formed between the piston (4) and the valve sleeve (2), and acts on a transverse end surface of the piston (4), a check valve (6) only allowing a single-direction flow to an LS flow channel (7) is disposed in an oil feeding chamber (4a) of the valve body (1), and the spool (3) establishes or blocks a connection between the oil feeding chamber (4a) and an oil discharging chamber (4d);

wherein a lower end surface (A4) of the spool (3) and a portion (A3) of an upper end surface of the spool (3) which matches a projection of the lower end surface (A4) onto the upper end surface have the same cross-sectional area as an upper end surface (A1) and a lower end surface (A2) of the piston (4), and a load pressure Pls from the pressure chamber (0c) and the return spring (5) act on the upper end surface (A1) of the piston (4) to drive the piston (4) to slide downward and to push the spool (3) upwards in a direction that blocks the connection between the oil feeding chamber (4a) and the oil discharging chamber (4d);

wherein an end of the spool (3) is a cylindrical structure that slides as a slide valve, the cylindrical section is formed with a radial hole (5b) for establishing or blocking the connection between the oil feeding chamber (4a) and the oil discharging chamber (4d); and an other end of the spool (3) is provided with a tapered groove (5c) and a spherical pillar (5a) protruding from the other end.

2. The pressure compensation valve of claim 1, wherein a channel hole (4b) for the check valve (6) is disposed at a bottom of the oil feeding chamber (4a), the check valve (6) detects a maximum load pressure Pls of the oil feeding chamber (4a) and inputs the maximum load pressure Pls into the LS channel (7) in a single direction so as to transmit a maximum load pressure signal accurately when the load varies.

3. The pressure compensation valve of claim 2, wherein when the oil feeding chamber (4a) has a pressure higher than or equal to the maximum load pressure Pls, the pressure of the oil feeding chamber (4a) acts on the portion (A3) of the spool to drive the spool (3) so that the oil feeding chamber (4a) connects with the oil discharging chamber (4d).

4. The pressure compensation valve of claim 2, wherein a tapered valve seat (4c) is disposed at a bottom of the oil discharging chamber (4d), the oil discharging chamber (4d) acts on the lower end surface (A2) of the piston and the portion (A3) of the spool simultaneously, and when the oil discharging chamber (4d) has a pressure higher than that of the oil feeding chamber (4a), the pressure of the oil discharging chamber (4d) drives the spool (3) to move downwards so that the tapered groove (5c) of the spool (3) abuts against the tapered valve seat (4c) of the valve body (1) tightly to form a check valve.

5. The pressure compensation valve of claim 3, wherein a valve hole (4g) for fixedly mounting the valve sleeve (2) is formed at the top of the valve body (1), the valve body (1) is further formed with an aperture (2a) for transferring the pressure Pls of the LS channel (7), and the valve sleeve (2) is formed with an outer groove (0a) and an inner groove (0b) as well as a radial aperture (2a) between the outer groove (0a) and the inner groove (0b).

6. The pressure compensation valve of claim 4, wherein a valve hole (4g) for fixedly mounting the valve sleeve (2) is formed at the top of the valve body (1), the valve body (1) is further formed with an aperture (2a) for transferring the pressure Pls of the LS channel (7), and the valve sleeve (2) is formed with an outer groove (0a) and an inner groove (0b) as well as a radial aperture (2a) between the outer groove (0a) and the inner groove (0b).

7. The pressure compensation valve of claim 5, wherein the piston (4) is formed with a step (3e), a through-hole (3b) is formed in the step (3e), the piston (4) is formed with a concave cylinder (3a) at an end thereof and a small cylinder (3c) protruding from the other end thereof, an axial opening (3d) of the concave cylinder (3a) connects with the through-hole (3b), and after being placed into the valve sleeve (2), the piston (3) is capable of sliding within the inner hole of the valve sleeve (2).

8. The pressure compensation valve of claim 6, wherein the piston (4) is formed with a step (3e), a through-hole (3b) is formed in the step (3e), the piston (4) is formed with a concave cylinder (3a) at an end thereof and a small cylinder (3c) protruding from the other end thereof, an axial opening (3d) of the concave cylinder (3a) connects with the through-hole (3b), and after being placed into the valve sleeve (2), the piston (3) is capable of sliding within the inner hole of the valve sleeve (2).

* * * * *